United States Patent Office 2,982,602
Patented May 2, 1961

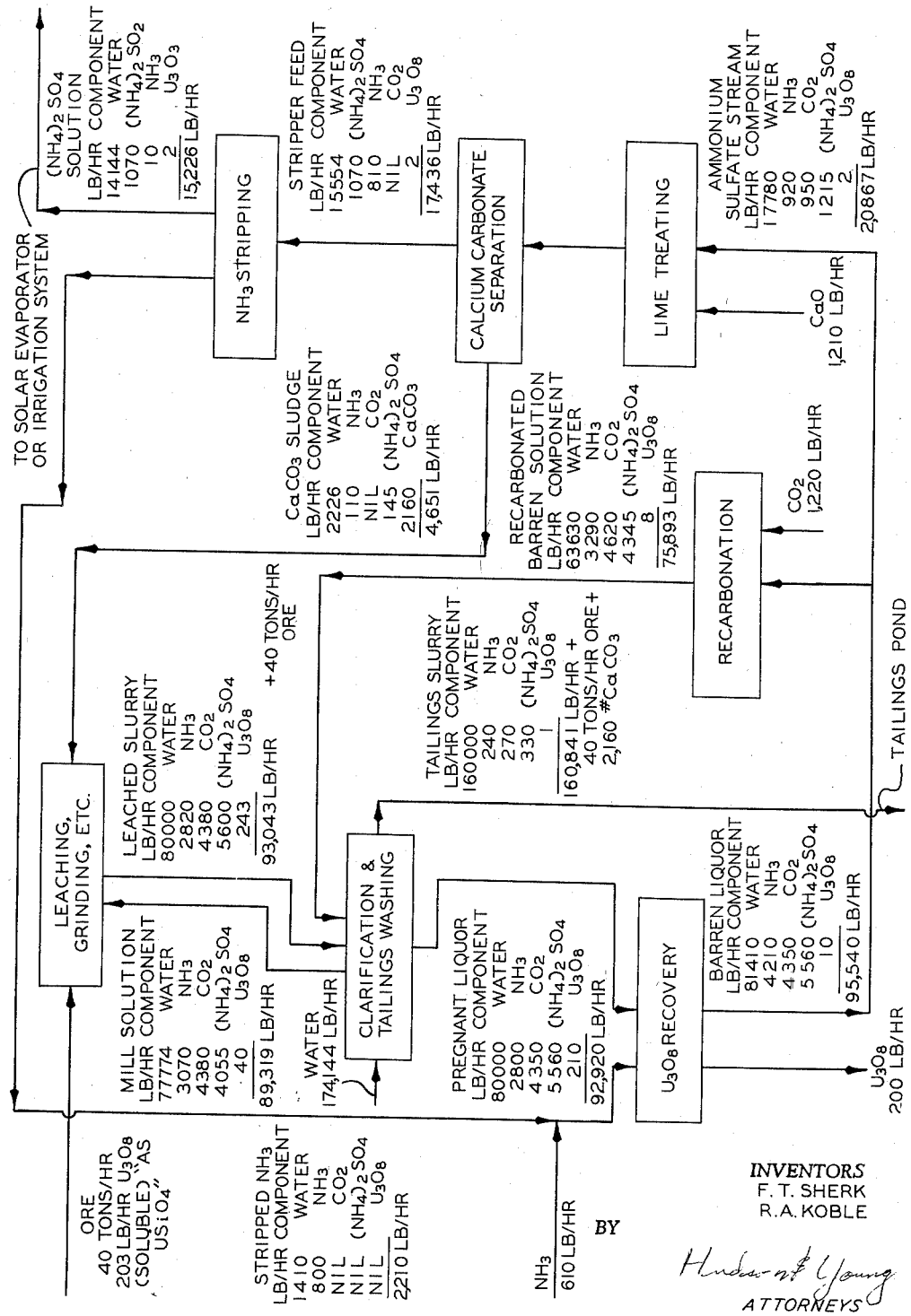

2,982,602

URANIUM MILLING

Fred T. Sherk and Robert A. Koble, Bartlesville, Okla., assignors to Phillips Petroleum Company, a corporation of Delaware Filed Apr. 21, 1958, Ser. No. 729,700

3 Claims. (Cl. 23—14.5)

This invention relates to improvements in the carbonate leach process of extracting uranium values from ore. In one specific embodiment the invention relates to treating ores having sulfides and sulfates therein so that the waste liquors therefrom will not constitute a pollution problem. The invention also specifically relates to producing ammonium sulfate in recoverable form as a byproduct of the carbonate leach process of extracting uranium from its ore.

In the past, soluble alkali metal carbonates have been used to leach uranium values from ore. The uranium is then precipitated from the solution formed upon leaching by contacting the latter with a hydroxide. Preferably, the hydroxide is that of the respective ammonium or alkali metal found in the carbonate. A problem is created in this process because the tailings produced are high in sodium and potassium values, principally sulfates which are derived from the sulfur compounds in the ore and, sometimes, in the process water. This constitutes a pollution problem because the source of water for the process, as well as underground water supplies for the surrounding countryside, will become very high in these values thus rendering the water unsuitable for drinking, irrigation or use in uranium processing. This problem is especially aggravated in many areas where uranium deposits are found and milled because of limited or variable local supplies of water. Inasmuch as the process is continuous for producing uranium it tends to produce a continuous and ever increasing pollution.

Ammonia has also been used in these processes. Although in such case ammonium sulfate is formed, and this could be used as a fertilizer, the solids in the tailings are so confused therewith that it is impracticable to utilize this as fertilizer.

Accordingly, the instant invention provides a process whereby a clean stream of ammonium sulfate solution is produced. This is accomplished by removing the liquid from the uranium precipitate formed as mentioned above, further precipitating and removing other values, and either evaporating the water from the remaining liquid to recover the ammonium sulfate as a solid, or applying this remaining liquid directly to the ground as a fertilizer. The latter mode of use is highly suitable in irrigated areas.

It is therefore an object of this invention to provide an improved carbonate leach process for extracting uranium. It is still another object whereby such a process is caused to produce a useful byproduct. It is a specific object to improve the carbonate leach process whereby ammonium sulfate is produced in recoverable form. Other objects and advantages will become apparent from the following disclosure.

In the drawing is shown schematically a flow sheet of the instant process having material balances shown thereon. This is submitted in lieu of an example to reduce prolixity in the specification.

Referring now to the drawing, an ore, preferably one high in sulfides and sulfates, is ground in several stages. In the final stages the grinding is carried out in the presence of water and ammonium and calcium carbonates. From the grinding step the slurry of ore, liquid and chemicals is pumped to a Pachuca tank where the ore is leached by heating the slurry and agitating it while supplying oxygen (air) thereto. The leaching reactions may be represented by the following equations:

I. $2FeS_2 + 15\tfrac{1}{2}O_2 + 8(NH_4)_2CO_3 + 7H_2O$
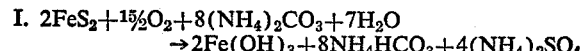
$\rightarrow 2Fe(OH)_3 + 8NH_4HCO_3 + 4(NH_4)_2SO_4$ II. (a) $3(NH_4)_2CO_3 + USiO_4 + \tfrac{1}{2}O_2 + H_2O$
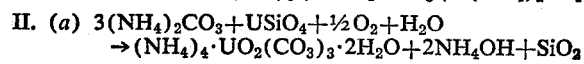
$\rightarrow (NH_4)_4 \cdot UO_2(CO_3)_3 \cdot 2H_2O + 2NH_4OH + SiO_2$ Precipitation due to the hydroxide is prevented by its concurrent reaction with the bicarbonate:

II. (b) $NH_4OH + NH_4HCO_3 \rightarrow H_2O + (NH_4)CO_3$

The leaching continues for a considerable length of time in order that upwards of 95 percent of the uranium in the ore may be recovered. The liquor formed is termed in the art the "pregnant" liquor and has therein the uranium values along with other soluble chemicals formed during the leaching. Preferably the pH ranges from 9.5 to 11.5.

After leaching, the pregnant liquor is removed to apparatus where it is clarified by removing entrained solid material therefrom. Preferably this is carried out by filtering, but decantation or settling may also be used as a means of clarifying. As shown in the flow sheet, wash water plus a portion of the barren solution, as described hereinafter, are supplied to aid in washing the solids in order to improve the recovery of chemicals therefrom. A part of the enriched wash water is returned to the grinding step. The solid material forms a slurry with a small portion of the filter wash water and is removed to the tailings pond. Some ammonium sulfate is dissolved in this tailings slurry water.

The clarified pregnant liquor is next removed to the uranium recovery step where uranium values are precipitated from the solution by increasing its pH above 11.5 by adding ammonia to it. The precipitating reactions may be as follows:

III. $NH_3 + H_2O \rightarrow NH_4OH \, 6NH_4OH$
$+ 2(NH_4)_4UO_2(CO_3)_3 \cdot 2H_2O$
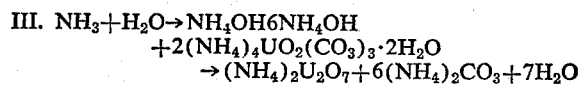
$\rightarrow (NH_4)_2U_2O_7 + 6(NH_4)_2CO_3 + 7H_2O$ When the precipitate is formed it is separated from the liquor by filtration, although decantation or settling could be used. The precipitate is then further processed by drying and packaging to form the yellow cake uranium product. The yellow cake contains at least 75% $U_3O_8$ and preferably 80–85% $U_3O_8$.

The barren liquor is the liquor remaining after the uranium values have been removed from the solution. As shown on the flow sheet, the barren liquor is divided into two streams and the first stream thereof is recarbonated. The recarbonation reactions may be represented by the following:

IV. (a)   $2NH_3 + CO_2 + H_2O \rightarrow (NH_4)_2CO_3$

IV. (b)   $NH_3 + CO_2 + H_2O \rightarrow NH_4HCO_3$

These reactions are carried out in a carbonating tower. The carbon dioxide necessary therefor is obtained from the combustion products of fuel used to supply heat to the leaching and the stripping step as hereinafter described. The purpose of the carbonation is to form ammonium carbonate and bicarbonate in order that an enriched wash water can be supplied for washing the solids in the clarification step in order that a still richer solution can be supplied for grinding. This washing and its consequent enriching of the solutions reduces the amount of chemicals required by the process.

The second stream of barren liquor is used to provide ammonia and a relatively clean by-product stream having ammonium sulfate as a principal constituent. This is achieved by neutralizing the barren liquor by adding lime. The neutralization may be represented by this reaction:

V.    $CaO + (NH_4)_2CO_3 \rightarrow CaCO_3 + NH_4OH$

The calcium carbonate formed in this reaction comes out as a sludge which can then be separated by filtration, decantation or settling and recycled to the grinding step. The liquid remaining after the calcium carbonate is separated is then sent to a stripping tower where heat is supplied to drive the ammonia out of solution. The stripping reaction may be represented as follows:

VI.    $2NH_4OH \overset{\Delta}{\rightleftarrows} \rightarrow 2NH_3 + H_2O$

The liquid remaining, as shown in the drawing, contains principally ammonium sulfate which can then be recovered as a solid or the liquid itself can be used as a fertilizer.

Solar evaporators are desirable for obtaining the sulfate in solid form. Preferably, one evaporator is filled while the other one is evaporating. The solid remaining after evaporation is harvested. The evaporator may comprise a dammed earthwork wherein the soil of the dam and the area defined by it are highly compacted. After the initial evaporation this is substantially impermeable. Of course, steam heated concentrators could be used, but they are not as economical.

In the above examples pH ranges have been given by way of example but not by way of limitation. Although uneconomical, the tailings slurry produced by this process can be subsequently clarified and the liquid used as a fertilizer in the same manner as the liquid product from the stripping tower. The stripper liquid product stream, if desired, could be recycled and used in lieu of some of the water supplied for washing and the clarification step. This is not very desirable for economic reasons.

Another modification of the process would be to recycle all of the barren liquor to the clarification unit, carbonating the entire stream en route. The ammonium sulfate is then recovered from the liquids that are sent to the tailings pond by decantation—letting the solids settle out of the slurry, then collecting the liquid and adding lime, as described above with respect to the stripper liquid stream. This process is uneconomical because a larger quantity of lime is required for recovery. The problems of solids separation, e.g., bulk storage facilities, also render this modification undesirable. Further, the loss of ammonia to the atmosphere is an uneconomical feature.

The treatment with lime is beneficial in several respects, because it removes chemicals from the stripper product stream and quite a bit of entrained solid matter from the solution. This benefits the stripping because it reduces or eliminates the fouling of heat transfer surfaces as well as providing a cleaner product stream out of the stripper. The calcium values that enter the process by the addition of lime leave with the tailings stream. If desired, the calcium carbonate sludge could be sent directly to the tailings pond or other storage instead of via the grinding and leaching.

If available, process water that is high in natural sulfides and sulfates can be used to increase the yield of ammonium sulfate.

In the construction of a system for practicing the instant process pressure-tight fittings and vessels must be used to reduce ammonia losses. Copper fittings, gaskets, control lines, and the like should be avoided. Carbon steel should be used for vessels, pipes, valves, etc. as a general rule.

Clarification of the pregnant liquor is preferably accomplished in the first of three stages: (1) separating solids from pregnant liquor, (2) washing the solids with barren liquor, and (3) washing the solids with wash water. The mill solution, as denoted on the drawing, is drawn from the barren liquor after its use in the second stage as wash water.

The ammonium sulfate product stream can be stored as a liquid, if desired, until applied in liquid form as a fertilizer. This liquid may be diluted to the proper strength when so employed. One means of applying the liquid would be to flow the solution into a stream of irrigating water. The ratios of the two are determined by the strength of the stored solution and that desired for irrigation.

In the leaching step, shown above, only the reaction with the carbonate has been set forth, but it is to be understood that ammonium carbonates and bicarbonates are both present in the lixiviant due to reaction of the carbonate with the hydroxide present (see Equation II). While a specific example is presented in the drawings that sets forth specific quantities and ratios of the materials and material streams in the instant process, it is to be understood that these are representative only and not by way of limitation inasmuch as our invention could be applied to any like process wherein ammonium sulfate can be formed as a product of the process. The make-up of the ore as to iron, silica, sulfur, and the like will vary the quantities of chemicals supplied.

We claim as our invention:

1. The process of extracting uranium values from sulfur-bearing ore comprising contacting the ore with a solution comprising ammonium carbonate under oxidizing conditions to form a pregnant liquor by leaching the uranium values from the ore; clarifying the pregnant liquid by removing entrained solids therefrom; contacting the clarified pregnant liquor with ammonia to precipitate a major portion of the uranium values therefrom; filtering the precipitate formed in the last-said contacting step thereby producing a filtrate; dividing the filtrate into a first stream and a second stream; carbonating said first stream by contacting the same with carbon dioxide; recycling the carbonated first stream to said clarifying step; contacting said second stream with lime; separating insoluble carbonates from the lime-contacted second stream; heating the liquid portion of said second stream thereby releasing ammonia; recycling the last-said ammonia to the second said contacting step, recycling said carbonates to the first said contacting step; and recovering ammonium sulfate from the liquid remaining from said heating.

2. A process of treating the barren liquor formed during the extraction of uranium values from sulfur-bearing ore by the sequential steps of leaching the ore with a lixiviant comprising ammonium sulfate and precipitating uranium values with a precipitant comprising ammonia, comprising the steps of dividing the barren liquor into first and second streams; contacting the first stream with carbon dioxide; washing materials with the first stream that are to be removed as tailings; contacting the second stream with a precipitant comprising calcium oxide; removing precipitate from the second stream; and heating the second stream.

3. The process of claim 2 wherein the step of washing is performed by adding wash water that contains sulfur values.

References Cited in the file of this patent

UNITED STATES PATENTS 2,597,504    Larsson _____ May 20, 1952
2,769,686    McCullough et al. _____ Nov. 6, 1956

OTHER REFERENCES

A.E.C. Document BMI-284 May 15, 1956, pp. 1-9. (Copy in Scientific Library.)

Proceedings of the International Conference on the Peaceful Uses of Atomic Energy, Aug. 8-20, 1955, vol. 8, pp. 1-7 and 18-25, United Nations (Copy in Scientific Library).